US009509681B2

(12) United States Patent
Lord et al.

(10) Patent No.: US 9,509,681 B2
(45) Date of Patent: *Nov. 29, 2016

(54) SECURE INSTANT MESSAGING SYSTEM

(71) Applicant: Google Inc., Mountain View, CA (US)

(72) Inventors: Robert B. Lord, Sunnyvale, CA (US);
Terry N. Hayes, Los Altos, CA (US);
Justin Uberti, Sterling, VA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,267

(22) Filed: May 15, 2015

(65) Prior Publication Data

US 2015/0264042 A1    Sep. 17, 2015

Related U.S. Application Data

(63) Continuation of application No. 13/646,579, filed on Oct. 5, 2012, now Pat. No. 9,071,597, which is a continuation of application No. 12/772,041, filed on Apr. 30, 2010, now Pat. No. 8,301,892, which is a continuation of application No. 11/553,673, filed on Oct. 27, 2006, now Pat. No. 7,739,508, which is a continuation of application No. 10/371,601, filed on Feb. 20, 2003, now Pat. No. 7,131,003.

(51) Int. Cl.

| H04L 29/06 | (2006.01) |
| H04L 9/32 | (2006.01) |
| G06F 15/16 | (2006.01) |
| G06F 21/33 | (2013.01) |
| H04L 12/58 | (2006.01) |
| H04L 29/08 | (2006.01) |

(52) U.S. Cl.
CPC ........... *H04L 63/0823* (2013.01); *G06F 21/33* (2013.01); *H04L 51/04* (2013.01); *H04L 63/123* (2013.01); *H04L 67/10* (2013.01); *H04L 63/0428* (2013.01)

(58) Field of Classification Search
None
See application file for complete search history.

(56) References Cited

U.S. PATENT DOCUMENTS

| 5,261,002 A | 11/1993 | Perlman et al. |
| 5,657,390 A | 8/1997 | Elgamal et al. |

(Continued)

FOREIGN PATENT DOCUMENTS

| EP | 1104964 | 6/2001 |
| WO | 03/001326 | 1/2003 |
| WO | 03/067809 | 8/2003 |

OTHER PUBLICATIONS

ZONE Labs; Smarter Security; IMsecure*Pro Release History, 2 pages.

(Continued)

*Primary Examiner* — Christopher Revak
(74) *Attorney, Agent, or Firm* — IP Spring

(57) ABSTRACT

A secure instant messaging (IM) system integrates secure instant messaging into existing instant messaging systems. A certificate authority (CA) issues security certificates to users binding the user's IM screen name to a public key, used by sending users to encrypt messages and files for the user. The CA uses a subscriber database to keep track of valid users and associated information, e.g. user screen names, user subscription expiration dates, and enrollment agent information. A user sends his certificate to an instant messaging server which publishes the user's certificate to other users. Users encrypt instant messages and files using an encryption algorithm and the recipient's certificate. A sending user can sign instant messages using his private signing key. The security status of received messages is displayed to recipients.

20 Claims, 6 Drawing Sheets

(56) References Cited

U.S. PATENT DOCUMENTS

| | | | |
|---|---|---|---|
| 5,671,279 | A | 9/1997 | Elgamal et al. |
| 5,838,792 | A | 11/1998 | Ganesa |
| 5,857,022 | A | 1/1999 | Sudia |
| 6,161,180 | A | 12/2000 | Matyas et al. |
| 6,215,877 | B1* | 4/2001 | Matsumoto ........... H04L 9/0825 380/277 |
| 6,301,609 | B1 | 10/2001 | Aravamudan et al. |
| 6,324,569 | B1 | 11/2001 | Ogilvie et al. |
| 6,348,935 | B1 | 2/2002 | Malacinski et al. |
| 6,430,602 | B1 | 8/2002 | Kay et al. |
| 6,636,733 | B1 | 10/2003 | Helferich |
| 6,674,725 | B2 | 1/2004 | Nabkel et al. |
| 6,854,057 | B2 | 2/2005 | Roskind et al. |
| 7,003,661 | B2 | 2/2006 | Beattie et al. |
| 7,120,929 | B2 | 10/2006 | Beattie et al. |
| 7,127,741 | B2 | 10/2006 | Bandini et al. |
| 7,131,003 | B2* | 10/2006 | Lord ................... H04L 63/0823 713/155 |
| 7,146,009 | B2 | 12/2006 | Andivahis et al. |
| 7,206,934 | B2 | 4/2007 | Pabla et al. |
| 7,269,852 | B2 | 9/2007 | Uemura et al. |
| 7,321,969 | B2 | 1/2008 | Schoen et al. |
| 7,558,955 | B2 | 7/2009 | Hooker et al. |
| 7,739,508 | B2* | 6/2010 | Lord ................... H04L 63/0823 709/206 |
| 7,877,784 | B2 | 1/2011 | Chow et al. |
| 7,975,290 | B2 | 7/2011 | Chow et al. |
| 8,301,892 | B2* | 10/2012 | Lord ................... H04L 63/0823 709/206 |
| 8,320,943 | B2* | 11/2012 | Tysowski ................ H04L 51/04 455/412.2 |
| 9,071,597 | B2* | 6/2015 | Lord ................... H04L 63/0823 |
| 2001/0050990 | A1 | 12/2001 | Sudia |
| 2001/0051996 | A1 | 12/2001 | Cooper et al. |
| 2002/0026574 | A1 | 2/2002 | Watanabe et al. |
| 2002/0026581 | A1 | 2/2002 | Matsuyama et al. |
| 2002/0029350 | A1 | 3/2002 | Cooper et al. |
| 2002/0032665 | A1 | 3/2002 | Creighton et al. |
| 2002/0035686 | A1 | 3/2002 | Creighton et al. |
| 2002/0103645 | A1 | 8/2002 | Uemura et al. |
| 2002/0188863 | A1 | 12/2002 | Friedman |
| 2002/0194471 | A1 | 12/2002 | Benatar et al. |
| 2003/0041110 | A1 | 2/2003 | Wenocur et al. |
| 2003/0046544 | A1 | 3/2003 | Roskind et al. |
| 2003/0093482 | A1 | 5/2003 | Watanabe et al. |
| 2003/0201720 | A1 | 10/2003 | Ooae et al. |
| 2003/0204720 | A1* | 10/2003 | Schoen ................ H04L 12/581 713/153 |
| 2003/0204722 | A1 | 10/2003 | Schoen et al. |
| 2003/0204741 | A1 | 10/2003 | Schoen et al. |
| 2004/0015610 | A1 | 1/2004 | Treadwell |
| 2004/0133684 | A1 | 7/2004 | Chan et al. |
| 2004/0133774 | A1 | 7/2004 | Callas et al. |
| 2004/0141594 | A1 | 7/2004 | Brunson et al. |
| 2004/0168055 | A1 | 8/2004 | Lord et al. |
| 2004/0210772 | A1 | 10/2004 | Hooker et al. |
| 2005/0138364 | A1 | 6/2005 | Roskind et al. |
| 2005/0172128 | A1 | 8/2005 | Little et al. |
| 2007/0050624 | A1 | 3/2007 | Lord et al. |
| 2007/0143408 | A1 | 6/2007 | Daigle |
| 2008/0134313 | A1 | 6/2008 | Lord |
| 2009/0215476 | A1* | 8/2009 | Tysowski ............... H04L 51/04 455/466 |
| 2010/0058058 | A1* | 3/2010 | Busari .................. G06F 21/445 713/169 |
| 2013/0005370 | A1* | 1/2013 | Tysowski ............... H04L 51/04 455/466 |

OTHER PUBLICATIONS

"About Us; History", www.ceruleanstudios.com, 1 page.
"Lending; Live Chat; Send to Chat; Hang Up", www.lending.etrade.com/e/t/mortgage/home, 1 page.
"Trillian Basic Overview", www.ceruleanstudios.com, 1 page.
"Trillian Basic Tech Specs", www.ceruleanstudios.com, 1 page.
"Trillian Pro 2.01", Home Page; www.ceruleanstudios.com, 1 page.
"Trillian Pro Overview", www.ceruleanstudios.com, 1 page.
"Trillian Pro Product Tour", www.ceruleanstudios.com, 1 page.
"Trillian Pro Tech Specs", www.ceruleanstudios.com, 1 page.
Day, et al., "A Model Presence and Instant Messaging", Network Working Group Request for Comments: 2778, Feb. 2000, pp. 1-16.
Day, et al., "Instant Messaging/Presence Protocol Requirements", Network Working Group Request for Comments: 2779, Feb. 2000, pp. 1-25.
E*Trade Mortgage Corp., Home Page; www.lending.etrade.com/e/t/mortgage/home_lending, 2003, 1 page.
E*Trade Mortgage Corp., "Lending; Live Chat", www.lending.etrade.com/e/t/mortgage/home, 2003, 1 page.
European Patent Office, European Examination Report for European Patent Application No. 03769009.6, Oct. 8, 2013, 3 pages.
Fong, et al., "Towards an open protocol for secure online presence notification", Computer Standards & Interfaces; School of Computer Engineering Nanyang Tech. Univ., Singapore, Feb. 19, 2001, pp. 311-324.
Fout, "Inside Windows Messenger—How it Communicates", XP-002545248; Microsoft Corporation, Redmond, WA, Oct. 2001, pp. 1-14.
McWilliams, "AOL Follows Trillian's Lead in Encrypted Messaging", www.securityfocus.com/print/news/40; XP-002545247; Connecticut, May 13, 2002, pp. 1-2.
Menezes, "Handbook of Applied Cryptography; Key Management Techniques", www.cacr.mat.uwaterloo.ca/hac, 1997, pp. 542-590.
Parviainen, et al., "Mobile Instant Messaging: Center for Distance-spanning Technology", Dept. of Computer Science, Lulea Univ. of Technology, Sweden, IEEE, 2003, 6 pages.
Pascal, "Enabling Chance Interaction Through Instant Messaging", IEEE Transactions on Professional Communication, vol. 46, No. 2, Jun. 2003, pp. 138-141.
Verisign, "Verisign Introduces Expanded SMS and MMS Messaging Services", PR Newswire; New York; http://Proquest.umi.com/pqweb?index, Feb. 24, 2004, 4 pages.

* cited by examiner

SECURE INSTANT MESSAGING SYSTEM

CROSS-REFERENCE TO RELATED APPLICATIONS

This application is a continuation of U.S. patent application Ser. No. 13/646,579, filed Oct. 5, 2012, which is a continuation of U.S. patent application Ser. No. 12/772,041, filed Apr. 30, 2010, now U.S. Pat. No. 8,301,892, issued Oct. 30, 2012, which is a continuation of U.S. patent application Ser. No. 11/553,673, filed Oct. 27, 2006, now U.S. Pat. No. 7,739,508, issued Jun. 15, 2010, which is a continuation of U.S. patent application Ser. No. 10/371,601, filed Feb. 20, 2003, now U.S. Pat. No. 7,131,003, issued Oct. 31, 2006, the entirety of each of which is incorporated herein by this reference thereto.

BACKGROUND OF THE INVENTION

Technical Field

The invention relates to instant messaging services across the Internet. More particularly, the invention relates to the secure transmission and reception of messages and files via an instant messaging service across the Internet.

Description of the Prior Art

Instant Messaging has changed a large population of Internet users' lives over the few years that such a service has been available. Users have the ability to conduct real-time conversations with other users. Friends and family keep in contact through group chatrooms and one-on-one chats. An entire culture has been created based upon Instant Messaging.

Users have the option to create lists of usernames that the user can monitor. The Instant Messaging programs notify the user when any of the users in the username lists are active and online.

Referring to FIG. 1, User 1 101 communicates to User 2 102 through the Internet 103. Messages sent between User 1 101 and user 2 102 are received and forwarded by the Instant Messaging Service 104. For example, the Instant Messaging Service 104 receives a message sent from User 1 101 and forwards the message to User 2 102 and vice versa. The Instant Messaging Service 104 also tells the users which users on their username lists are logged on.

With respect to FIG. 2, of the instant messaging services currently available from America Online, Incorporated, Microsoft Corporation, Hotmail, and Yahoo, Incorporated, America Online, Incorporated's AOL Instant Messenger (AIM) 201 service is the most popular and is on the forefront of instant messaging technology. AIM has been very successful in the home and consumer market, allowing people to communicate with friends and relatives immediately all over the United States and the world. AIM is so prolific that the phrases "buddy list" (a feature of AIM) and "I-M me" have become part of the current Pop culture.

Instant Messaging has operated in a unsecure environment. Typical consumers do not have any use for secure communications with other users. However, a growing number of people use AIM in the business environment to communicate with co-workers, and with people they do business with at other companies.

While business users find the convenience of AIM very useful for business purposes, they quite often have a nagging worry over the privacy of the information that is sent through this service. These "enterprise" users would like to have assurance that their data cannot be viewed by outside parties such as ISPs, network routers and the AIM service itself. America Online, Incorporated announced in May of 2002 that it would be providing a secure AIM service that would allow users to transmit and receive messages in a secure environment. A non-public Beta test program of the secure AIM product was conducted in May of 2002.

It would be advantageous to provide a secure instant messaging system that provides secure messaging and file transfer between users. It would further be advantageous to provide a secure instant messaging system that operates within the current instant messaging architecture.

SUMMARY OF THE INVENTION

The invention provides a secure instant messaging system. The system provides secure instant message and file transfer between users and peer publication of user security certificates. In addition, the invention operates within the current instant messaging architecture.

A preferred embodiment of the invention integrates secure text instant messaging and secure file transfers into existing instant messaging systems. At least one certificate authority (CA) is provided that issues a security certificate to a user that binds the user's instant messaging screen name to a public key. The public key is used by other users to encrypt messages and files sent to the user and by the user to decrypt the received messages and files.

A subscriber database is used by the CA to keep track of valid users and their associated information, such as: user screen names, user subscription expiration dates, and enrollment agent information.

A user sends his certificate to the invention's instant messaging server which publishes the user's certificate to other users that have the user on their preferred user list. Other users that are listed on the user's preferred user list can be optionally automatically notified when the user's certificate changes. The instant messaging server creates a hash value of the user's certificate and passes this fingerprint to the listed users. The hash value allows the recipients to decide if they need to update their caches with a new copy of the user's certificate. The recipient compares the received hash value with one that exists in their cache. If the hash values do not match or the cache hash value does not exist, then the recipient requests the user's certificate and hash value from the instant messaging server. The user can also send his certificate status information for publication to the recipients.

The user can sign instant messages using his private signing key. Recipients verify the sender's signature by using the sender's public signing key.

Instant messages and files are encrypted by a sending user using an encryption algorithm and the recipient's certificate. The encryption algorithm can be attached to the encrypted message or file for use by the recipient to decrypt the message or file. The message or file is sent to the instant messaging server which forwards it to the receiving user if the user is logged on. The security status of each received instant message is displayed to the user.

The sending user can also wrap the encrypted instant message or file using a wrapping algorithm and wrapping key. The wrapping algorithm and key are attached to the encrypted instant message or file. The wrapping algorithm and key are extracted by the recipient and used to unwrap the encrypted instant message or file.

Other aspects and advantages of the invention will become apparent from the following detailed description in combination with the accompanying drawings, illustrating, by way of example, the principles of the invention.

DETAILED DESCRIPTION

Figure 1:
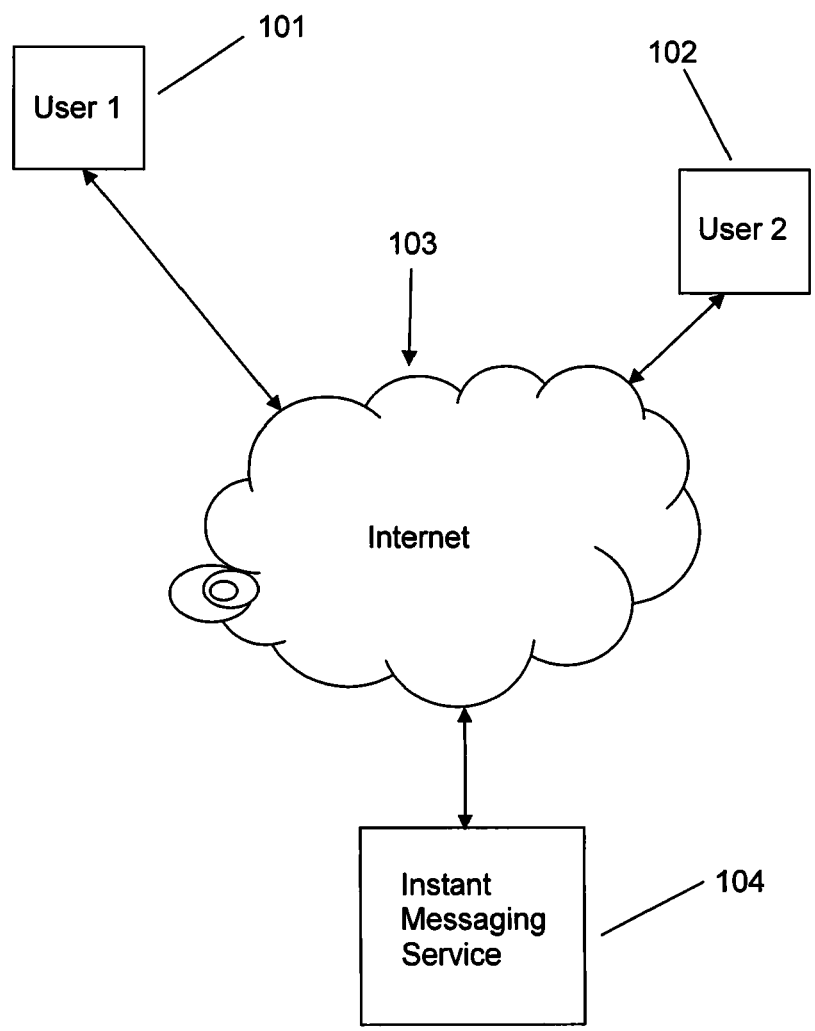
FIG. 1 is a diagram of a prior art approach of an instant messaging service across the Internet according to the invention.
Figure 2:
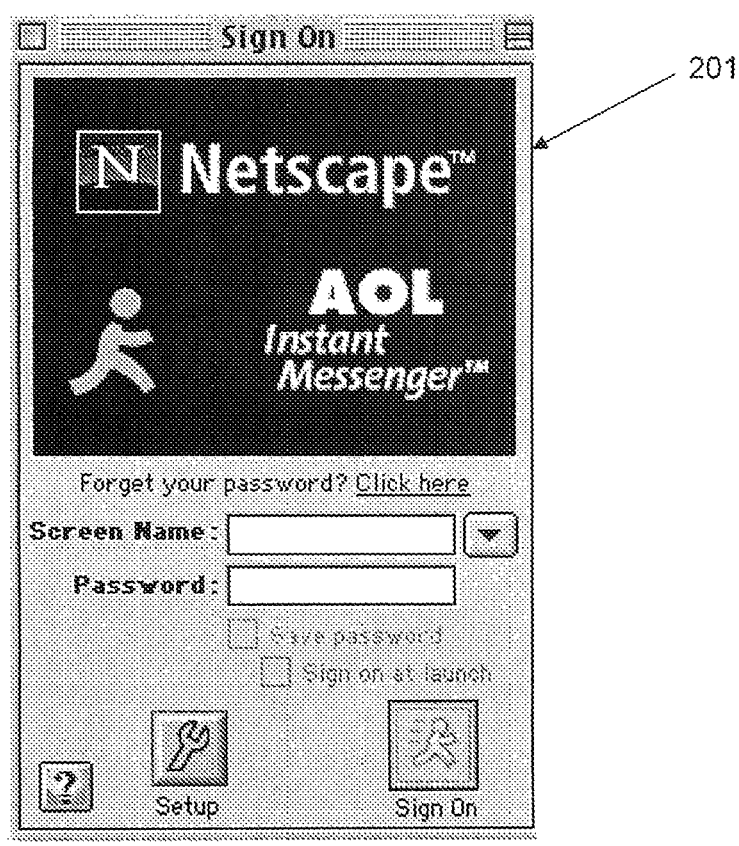
FIG. 2 is a diagram of a login screen for AOL Instant Messenger (AIM) according to the invention.

The invention is embodied in a secure instant messaging system. A system according to the invention provides secure instant message and file transfer between users and peer publication of user security certificates. In addition, the invention operates within the current instant messaging architecture.

The invention provides a secure instant messaging system that provides users with a secure end-to-end message and file transfer service. The invention uses the same basic infrastructure as existing instant messaging services. Secure messaging and file transfers occur between any client using the instant messaging service, e.g., desktop computers, laptop computers, portable devices, and wireless devices users have the same basic user interface (UI) that they are used to such as adding other user's screen names to their buddy lists, being notified when users on their buddy lists are logged on, chat UI windows, etc.

Data transferred using the invention's message and file transfer protocol are encrypted while transmitted over the network. Encryption is typically only required during the transfer. The data are stored at each end in normal (plaintext) form.

The data transferred are protected against alteration while transmitted over the network. A cryptographic signature on a file or document can be used to verify the data in the file and the identity of the signer. The protocol also ensures that the correct data are received for an entire file or document, even when only parts of the file are transmitted because portions of the file were already on the recipient's system (partial transfer mode).

When a portion of a file is already present on the recipient's system, the invention tries to optimize the data bandwidth by sending only the remainder of the file. Current file transfer protocols use a "checksum" value to check that the data that is already available is correct. This is not secure. The invention modifies the protocol to include a new (optional) value that is a SHA-1 hash of the portion of the file that is already available. The algorithm used to compute the hash is also sent in the message to allow changes in the future. The sending client checks this value to determine whether to send the entire file, or just the remainder.

The sending client sends the entire file if the hash does not match, or it does not recognize the algorithm used for the hash. The transfer never fails when the hash does not match—instead the entire file is resent.

The invention provides a means to identify both the sender and the recipient of a data transfer. In particular, the identity of a user that is requesting a file must be securely established so that access control decisions can be made based on that identity. The identity of the user transmitting the file needs to be securely established so that the recipient can be sure he is receiving the information from the source he expected. If multiple steps are used in the data transfer, the invention ensures that the same identity is used for the entire transfer.

The invention also generates a receipt that indicates that a file or document was received and will be processed. Receipts can contain a date, the name of the file and (optionally) a value computed from the contents of the file. Receipts acknowledge that the data was received and will be processed, not that the data is correct.

The file sending client is able to request a receipt by setting a predefined bit in one of the protocol header fields being currently used in instant messaging systems. When the transfer is complete, the recipient constructs the receipt and sends it in a predefined protocol record before the normal completion record.

The invention generates a cryptographic signature on a file or document that can be used to verify the data in the file and the identity of the signer. Signatures are typically stored separately from the contents of the file so application programs can use the transferred file without needing to process signature values. The invention can transmit the signatures as an additional file associated with the primary file.

Signatures are generated by a signature generation tool and stored in a separate file with a related file name. For example, a document called "expenses.xls" would be "signed" by the tool, creating a new file called "expenses.xls.sig".

Clients that support secure file transfer recognize the related signature file and can, for example, transfer the two files together, or offer to transfer the signature in addition to the data file itself. Clients can create these signature files on the fly by creating the contents in a temporary location, or in memory, and transmitting them to the recipient by specifying the related file name. This operation can be invoked by checking a box in the file transfer UI.

The invention is compatible with clients that do not support the secure mode. Secure clients are able to perform file transfers without the security features and display the status of the transfer to the user.

If both clients in the file transfer are capable of secure mode, the peer-to-peer connection made between them will be established using SSL. The ability to use the secure channel will be indicated in the proposal offered by the client initiating the request and must be also be indicated in the acceptance to the proposal.

The SSL channel is authenticated at both ends by using certificates issued for screen names such as AOL Instant Messenger (AIM) screen names. The AIM client accepting the connection (listener) will use an "encryption" certificate to perform the role of an SSL server. The AIM client establishing the connection will use a "signature" certificate to perform the role of an SSL client.

The clients use the existing file transfer protocol of the instant messaging system (with some modifications) over the SSL channel. The SSL channel provides security for protocol records (headers etc). This provides privacy for the file names being transferred, and prevents modifications to the requests and responses in the protocol. In addition, the identities established by SSL are used to make access control decisions.

The invention provides for instant messaging, but is not limited to, the following:

1. Transmits messages confidentially (using encryption) from the sender all the way to the recipient (peer-to-peer).
2. Signs messages to prove the identity of the sender.
3. Ties the keys used for encryption and signing to Instant Messaging screen names.
4. Extends to all instances of Instant Messaging services such as AIM, including stand-alone client, and mobile clients such as PocketPC devices that have capabilities near to desktop systems.
5. Minimizes new demands on the Instant Messaging service to prevent scaling problems as the number of secure users increases.
6. Performs cryptographic operations in a FIPS validated module (Level 1 or 2).
7. Provides basic protection against message replay attacks.
8. Supports applications of Instant Messaging that may be developed in the future. This includes alert services, forwarding to email, and storage of messages to offline subscribers.

For file transfers, the invention provides, but is not limited to:

1. Authenticating the users at each end of the file transfer connection;
2. Secure restart;
3. Signatures and receipts.

Messages that are encrypted on the device or desktop are not decrypted until they arrive at the intended destination. Designs for instant messaging that encrypt the data on a hop-by-hop basis (such as SSL protected channels) are not sufficient since the data is "in the clear" at each host that forwards the message content.

In many cases the origin of the message is important. This is particularly true of messages that ask the recipient to take some action, such as stock market orders sent from an account holder to a broker. The recipient must be able to verify the authenticity of the instant message. Again, solutions that use hop-by-hop protection of the message do not meet this requirement. A design that allows saving a persistent record of the authenticity of the message is also desirable.

The keys used to encrypt messages, and to verify signatures on received messages are tied to a particular AIM screen name. A certificate authority (CA) at the AIM service issues a certificate that binds the AIM screen name to a public key (RSA key). A certificate links a single screen name with a key. If an AIM user has more than one screen name, he may enroll each additional screen name to get a certificate based on that name.

In addition, AIM users may acquire a different certificate to use at different locations (such as home or work locations) where they will use AIM. Issuing certificates for each location is one implementation. Location independent certificates (one per screen name) are also provided. The AIM service deploys several instances of these certificate authorities to support a large number of secure AIM users.

Each of the CAs that issues certificates for screen names will itself be issued a certificate that indicates its role in the secure AIM system. These certificates are issued by a "primary" secure AIM CA. The primary will in turn be issued a certificate by the AOL "root" CA (described below).

The instant messaging client includes a certificate (and therefore the public key) for the root CA. This root CA is used as the starting point for checking the validity of a certificate that claims to associate a key with an AIM screen name.

The instant messaging client generates public/private key pairs, and requests and installs certificates that associate its screen name with the key that it possesses.

The design of the secure messaging system is intended to add as little state management and processing requirements as possible to the AIM service itself. Instead, the additional burden is placed on the client applications. In particular, the design will minimize the impact on the AIM servers for: bandwidth (size of messages) number of messages processing of messages storage.

There will be some need for additional storage for each connected client, but any additional storage or processing for instant message conversations is kept to a minimum.

The invention's secure messaging system protects against common attacks by keeping data secret, preventing modification of the data, and identifying the source of the data. The application also prevents some level of "replay" attack, where previously sent data is captured (somewhere in the network) and resent to the recipient at a later time by including timestamp information in the messages.

Secure messages within AIM are based on the existing secure email technology (sometimes called S/MIME). At the current time, this method is used instead of SSL connections to the AIM servers for the following reasons: End-to-end protection—SSL connections to the secure service leave the message in the clear as it is routed to the eventual recipient, meaning that instant messaging servers could easily observe (or modify) the contents of messages. Store-and-forward—when the recipient is not immediately available, secure messages can be stored in the service for delivery at a later time. SSL requires an existing connection to the destination. Compatibility with email—in the future, secure AIM messages can be delivered by email to applications that use the existing secure email format. Reduced overhead—SSL connections require state to be maintained in the clients and the service. Also, the load on the servers would increase due to the computational requirements of SSL handshakes. Compatible with alert services—the source of the alert can encrypt a message using S/MIME without a direct connection to the recipient.

SSL may offer advantages over the S/MIME approach in the future. This means that the invention can take advantage of SSL at that time. Although S/MIME and SSL are specifically mentioned in the text, one skilled in the art will readily appreciate that other secure communication protocols may be used in place of S/MIME and SSL.

System Overview

Figure 3:
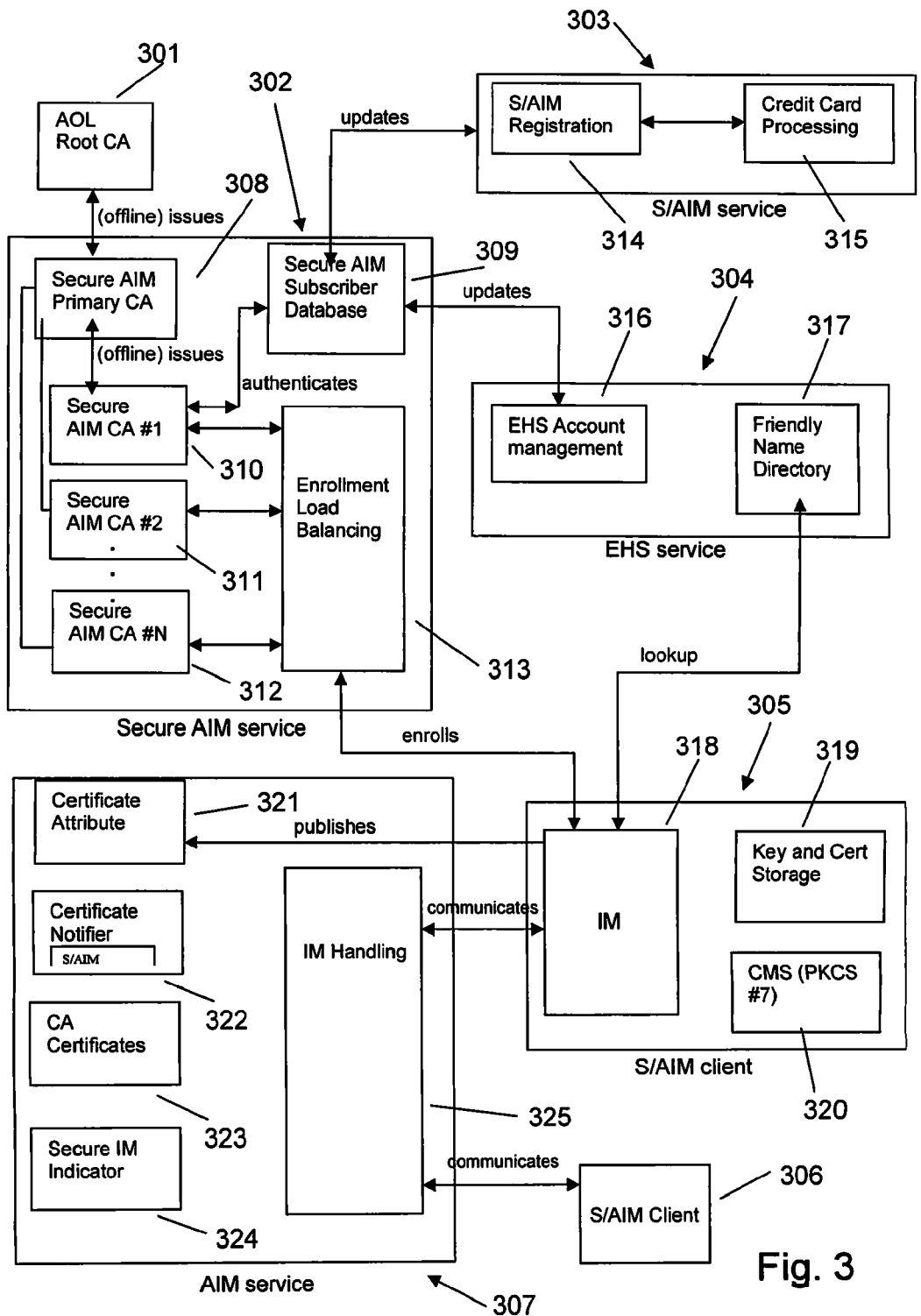
FIG. 3 is a block schematic diagram of a secure AIM system integrated into an AIM system with secure AIM clients according to the invention.

Referring to FIG. 3, the components of the invention's secure Instant Messaging system (or Secure AIM) are:
The AOL Root Certificate Authority 301;
The Secure AIM (S/AIM) CA 308;
The S/AIM Subscriber Database 309;
Enrollment Hosting Service (EHS) 304;
The AIM Service 307; and
AIM Clients 305, 306.

The AOL Root CA 301 and the Secure AIM CA 308 provide the certificate issuing and management portion of the infrastructure. The S/AIM Subscriber Database 309 and EHS service 304 provide enrollment of users. The existing AIM Service 307 and clients are modified to support publishing S/AIM certificates and handling secure messages.

Publishing refers to a user's ability to have a fingerprint of his S/AIM certificate distributed to those users on his buddy list (list of preferred users) or users that have him on their buddy list. The fingerprint is sent to the users on his buddy list and/or the users that have him on their buddy list which enables the users to decide if they need to update their caches with a new copy of his certificate.

The AOL Root CA 301 provides the trusted anchor for validating certificates used for Secure AIM 302. A self-signed certificate from the Root CA 301 is built into the clients 320 for Secure AIM. The Root CA 301 does not take part in day-to-day operations.

The Secure AIM CA 308 provides certificates that link an AIM screen name with a public key value. To provide the scalability to support a large number of secure AIM users, the Secure AIM CA 308 will be implemented as a "cloned" CA, with additional clone instances 310, 311, 312 added as required by the number of subscribers. The AOL Root CA 301 issues a certificate to the set of clones 310, 311, 312.

The S/AIM Subscriber Database 309 maintains information about current subscribers. It receives subscription information from "enrollment agents" and provides this information to the S/AIM CA 308, 310, 311, 312.

The Enrollment Hosting Service (EHS) 304 serves as an "enrollment agent" for Secure AIM. As users are added to EHS 304, some of them (depending on the type of account) are added as subscribers for Secure AIM 302. Other "enrollment agents" can be added to the system. In particular, an individual subscription service may provide access to Secure AIM 303 by allowing customers to pay for the service using a credit card, or other online payment method.

The AIM Service 307 itself is modified to provide a method for publishing certificates and revocation status information for Secure AIM 302 and to allow marking particular instant messages as secure, so that the recipient will perform the correct processing. The AIM service 307 also controls access to the Secure AIM features by providing the publishing and secure message delivery only to users listed in the S/AIM Subscriber Database 309.

AIM clients 305 support enrolling in Secure AIM 302 by requesting and managing certificates for the user's screen name. The clients send and receive secure instant messages, validate the certificates associated with those messages, and display information about the security of an instant message conversation to the user.

Secure AIM Subscriber Database 309

The subscriber database for Secure AIM 309 includes the following data;
1. Screen Name (key);
2. Expiration date;
3. Enrollment agent information.

The screen name (in canonical form) is used to search the database and is the key for updating the subscription information. The expiration date indicates when the subscription ends. The Secure AIM CA 308 (or other CA) uses this value to determine whether a subscriber is still enrolled and to compute the validity period for certificates that it issues.

Subscriber Database Service.

The subscriber database is part of the AIM Master File or a closely related database file.

There are three types of users of the subscription database; instant messaging servers, enrollment agents, and certificate issuers.

The instant messaging servers connect to the S/AIM subscription database 309 to determine whether a user should be allowed to use the Secure AIM functions of the service. In particular, only subscribers are allowed to publish security data (certificates etc.) and send or receive secure messages.

Enrollment agents add and update entries in the S/AIM subscriber database 309 as screen names are added to the Secure AIM subscriber list or the length of the subscription changes. The agents represent services like EHS 304, which may provide secure AIM as part of the enterprise package or a Secure AIM business, which may charge individual users by credit card.

Certificate issuers (the Secure AIM CAs 308, 310, 311, 312) consult the S/AIM subscriber database 309 to determine whether a subscription exists for a particular screen name and the length of time it is valid. This information is used to decide whether to issue a certificate and calculate the validity period for the certificate.

Enrollment agents and certificate issuers access the S/AIM subscriber database 309 using SSL with an account name and password. An administrator for the Secure AIM Subscriber Database 309 assigns and distributes account names and passwords for the enrollment agents and certificate issuers.

Secure AIM Subscription

The Secure AIM feature is optional. Users of this capability need to subscribe to use the service. A list of screen names that have subscribed and associated data about them are maintained in a directory or other similar database (the S/AIM subscriber database 309). The Secure AIM CA 309, 310, 311, 312 uses the S/AIM subscriber database 309 to determine whether the user has subscribed to the optional service.

Consumer Enrollment

A regular AIM user can upgrade his account to a secure AIM account by enrolling using the S/AIM service 303. The user will go to an enrollment web page (using a normal Web browser), authenticate using his screen name and password, and provide payment data. Once the enrollment application 314 verifies the payment information 315, an entry is made in the S/AIM subscriber database 309 to indicate the new status.

The S/AIM service 303 is an "enrollment agent". An administrator for S/AIM must contact an administrator for the Secure AIM subscriber database 309 to obtain an account name and password to use for updating subscription information. Data that is used only by the S/AIM service (the subscriber's credit card data, email, and other security data) is maintained separately by the S/AIM service 303. This separate data is used to bill the subscriber, and to support help desk operations.

EHS Enrollment

The EHS service 304 provides AIM screen names 317 for each of its user accounts (or may provide this as an optional feature). When a new EHS user account is created, the EHS service 304, 316 assigns a screen name, and inserts a record into the S/AIM subscriber database 309. The administrator for the EHS service 304 contacts the S/AIM subscriber database administrator to receive an "enrollment agent" account name and password. The EHS administrator configures the EHS user management system 316 using this information.

Enrollment Agent Example: Certificate Issuing Service

A Certificate Issuing Service is a partner for selling secure AIM subscriptions and issuing certificates that can be used for secure AIM. the Certificate Issuing Service is also an enrollment agent and has the ability to create AOL screen names for customers and to add the customer to the S/AIM subscriber database 309. Accounts that are managed by the Certificate Issuing Service are indicated in the subscription database. The Secure AIM RA (see below) uses the information to forward certificate requests from the Certificate Issuing Service customers to the Certificate Issuing Service CA.

Activating Secure AIM

Once a user has subscribed to Secure AIM service 302, he needs to create the public key pairs and certificates that will be used to provide security for the messages. The AIM service 307 notifies the client 305 that the user has subscribed to the Secure AIM premium service. If the client does not have certificates and keys 319 stored to use for Secure AIM, it will activate the premium service by generating keys 320 and requesting the certificates for them 323. This operation happens automatically, without any action by the user.

Subscribers to the Secure AIM service are managed by one of the enrollment agents. There are currently three agents defined: premium services, EHS and third party (e.g., VeriSign). For the first two, certificate requests are sent to the AOL Secure AIM CA 308, 310, 311, 312. For the last, the request is sent to the third party. The S/AIM subscriber database 309 can be used to indicate which CA should receive the request 308, 310, 311, 312.

One embodiment of the invention's approach to routing the request is to tell the AIM client 305 which CA 308, 310, 311, 312 it should use (as part of the subscription data). There is a possible security problem with this approach. It is very important to send the certificate request to a trusted CA, since the request includes the screen name password.

To resolve this security problem, the client 305 has a single location for sending certificate requests (the Secure AIM RA 313). The RA's 313 function is to consult the S/AIM subscriber database 309 and route the request to the appropriate CA 308, 310, 311, 312.

An S/AIM client 305 performs the following steps during activation: 1. Generates two new public key pairs (RSA key, 1024 bits), one for signing and one for key establishment (encryption) or generates one new public key pair (RSA key, 1024 bits), for both signing and key establishment (encryption). 2. Generates a certificate request, including the AIM screen name and the new public key. 3. Generates authentication data from the certificate request and the user's screen name password. 4. Combines the requests and the authentication data into a certificate enrollment message using CMC (an IETF standard). 5. Transmits the enrollment message to the Secure AIM RA 313. The message is sent over an SSL channel (to protect the screen name password) using an HTTP POST method.

The Secure AIM RA 313 performs the following steps:
1. Looks up the record for the requested screen name in the secure AIM subscriber database 309.
2. Checks that a subscription record was found, and that the expiration time for the subscription has not passed.
3. Uses the user's screen name password to verify the authentication data in the certificate request.
4. Forwards the request to the CA 310, 311, 312 that is listed in the subscription database record for the user.
5. The CA creates and signs a certificate that contains the screen name and the public key. The certificate has a validity period beginning at the current time and ending at the expiration time of the Secure AIM subscription.
6. The CA transmits the certificates that were created (along with certificates needed to create a valid certificate chain to the AOL Root CA 301) to the subscriber via the RA 313.

When the S/AIM client 305 receives the newly created certificates, it stores them in a local database 319 (using the NSS library APIs) and sets preferences for the AIM account to indicate which certificate should be used.

This activation step takes place at each location where the user connects using the subscribed screen name. Activation happens only once at each location.

Figure 4:
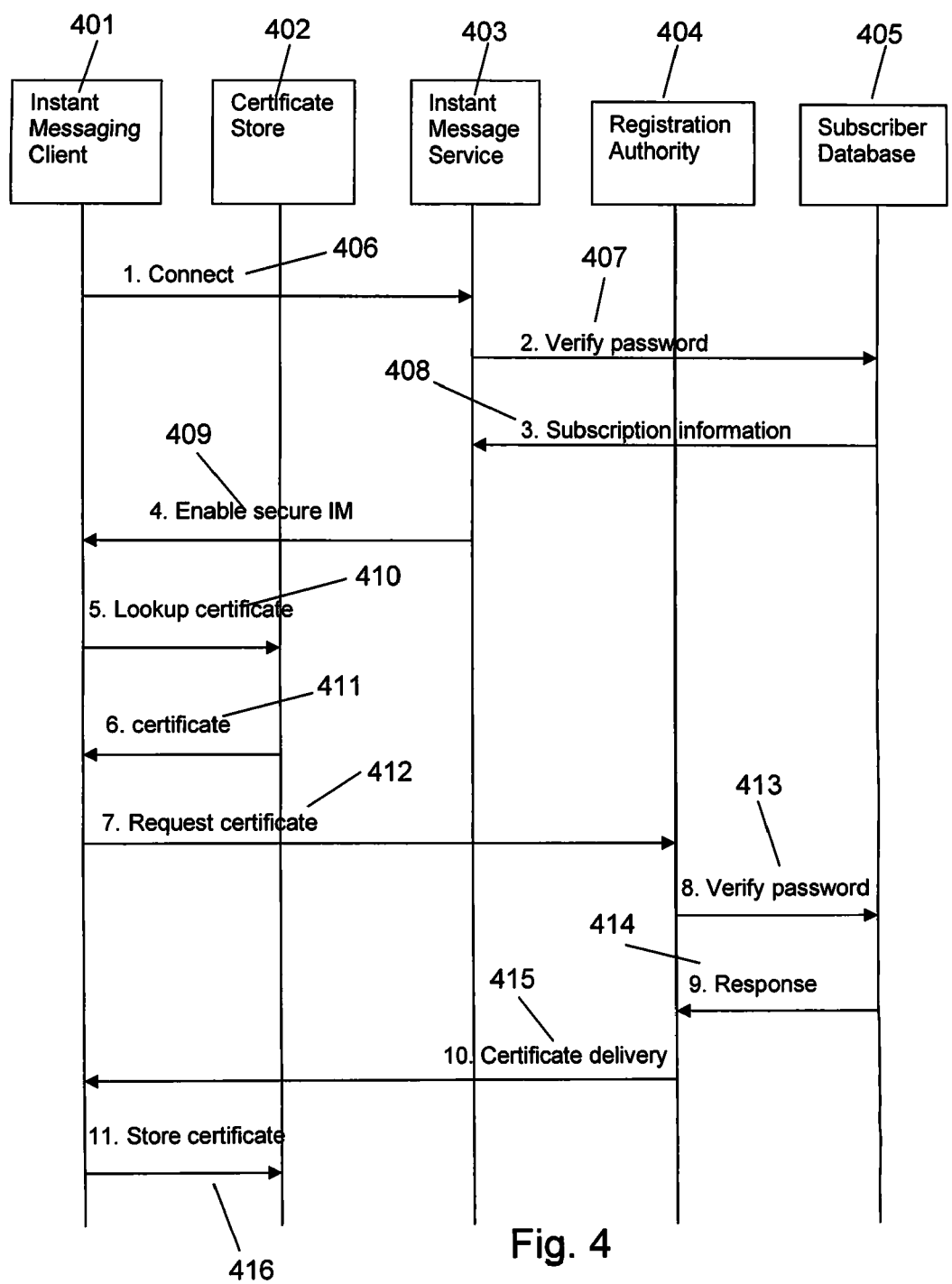
FIG. 4 is a block schematic diagram showing communications flow between secure AIM modules during a user enrollment process according to the invention.

With respect to FIG. 4, a communication diagram showing interaction between modules of the invention during an enrollment sequence is shown. The steps that occur are: 1. The IM client 401 sends a connection request 406 to the IM service 403. The request includes a screen name and password to authenticate the user and requests subscription information. 2. The IM service 403 sends a request 407 to an S/AIM subscriber database 405 to verify the password and retrieve a list of subscriptions. 3. The S/AIM subscriber database 405 returns the results of verifying the password and the list of subscriptions for the user 408 to the IM service 403. 4. The IM service 403 completes the connection and notifies the IM client 401 whether the secure capability is available 409. 5. If the response from the IM service 403 indicates that secure IM is enabled, the IM client 401 attempts to locate a certificate 410 in a certificate store 402. This can be a local file or in another location on the network. 6. The certificate store 402 returns the certificate 411 to the IM client 401 if one is found. 7. If secure IM is enabled, but no certificate is found, the IM client 401 creates a certificate request 412 (including a newly generated public key) and sends it to a registration authority 404 along with a screen name and password. 8. The registration authority 404 sends a request 413 to the S/AIM subscriber database 405 to verify that the correct password has been sent in the certificate request. 9. The S/AIM subscriber database 405 indicates whether the password was correct and provides subscription information 414. 10. If the account information is correct and the user has subscribed to secure IMs, the registration authority 404 returns a new certificate 415 (containing the key) to the IM client 401. 11. The IM client 401 stores the certificate 416 in the certificate store 402 so it can be used during the next IM session.

Using Secure AIM

Sending a Secure Message

This section describes an example of the steps that the AIM client performs to send and receive secure instant messages. Both activities can be broken into two parts:
an encryption (decryption) step and a signing (verification) step.

Signing Steps
1. Locate the signing key and associated certificate
2. Extract the signing identity from the certificate
3. Create the signature on the data using the signing key (RSA)
4. Encode the outgoing message (ASN.1 SignedData):

Encryption Steps
1. Use the desired recipient name to locate a certificate containing the public key for encryption.
2. Validate the certificate according to local rules (Gives level of certainty).
3. Generate an AES key to encrypt the message (AES Key Generation)
4. Wrap the AES key in the user's public key (RSA-OAEP)
5. Extract identity information from recipient's certificate that will be used to specify the public key used to encrypt the message.
6. Generate an IM and encrypt the outgoing data
7. Encode the outgoing message (ASN.1)

The encryption steps can be divided into two portions: first, a valid key for the user is identified and used to wrap a newly generated AES key (steps 1 4); the wrapped key value can be associated with the recipient name. In the following steps (5, 7), this wrapped value and the AES key is used to generate the outgoing message. See the discussion on session establishment (below) for a way to reuse the value from the first portion of the process to improve performance.

Receiving a Secure Message

A CMS Enveloped message contains the following data: identity of the wrapping key (usually issuer and serial number from a certificate, but key id is allowed); wrapping algorithm and parameters (usually RSA which has no parameters); a wrapped key value; the encryption algorithm and parameters (usually AES, which has an IV); the encrypted data.

Decryption Steps

1. Parse the incoming message, and recover the identity of the key.
2. Check that the identity of the key matches the one being used by the device or, if more that one key can be active, locate the correct private key from its related certificate. The identity value from the certificate can be preconfigured on the device, so no certificate processing is required here.
3. Unwrap the encryption key. This uses RSA private key operations. For example, for AES, the OAEP padding scheme may be required and for 3DES, standard PKCS #1 padding may be required.
4. Decrypt the data using the unwrapped key:

Decryption Summary

ASN.1 Parsing for a limited set of the CMS (RFC 2630); look up key by Issuer & Serial Number (comparison code); RSA unwrap operation, generating an AES key (RSA-OAEP); AES decryption.

Publishing Certificates

The invention provides the ability to publish digital certificates for a user, as well as basic MIME awareness for the IM message body. This allows for several interesting possibilities, including S/MIME secure IMs and secure peer-peer sessions.

For S/MIME secure IMs, the sending client can request the encryption certificate for a buddy. This certificate can be cached. After validating the certificate against the buddy's screenname, the sending client then takes the IM plaintext, encrypts it according to PKCS #7, marks the message as a PKCS #7 encrypted message, and sends it over the normal IM channel. Upon receipt, the receiving client notes that the message is an encrypted message and decrypts the message to get the IM plaintext. If the sender signed the message, the recipient can then request the sender's signing certificate and use it to verify the signature.

Certificates are of nontrivial size, and so requesting certificates for every message would be very inefficient. As a result, when a user publishes a certificate, users who buddy list this person will receive an hash of the user's certificate info. Therefore, when certificates are received, they can be cached and, as long as the hash of the cached certificates matches the hash received in the buddy updates, there is no need to re-request the user's certificates.

USE EXAMPLES

The complete S/MIME secure IM use case looks like this:
1. User A signs on, has user B in buddylist, publishes secure IM capability and certificates.
2. B signs on, has A in buddylist, publishes secure IM capability and certificates. 3. A receives B's certificates hash.
4. A creates plaintext IM.
5. A gets B's certificates from cache, if present, or from S/AIM server.
6. A verifies B's encryption certificate.
7. A applies MIME headers to plaintext IM.
8. A generates signature of MIME IM using A's private signing key.
9. A encrypts MIME IM using B's public encryption key.
10. A generates new IM according to PKCS #7 from result of encryption/signature.
11. A tags new IM as application/pkcs7-mime.
12. A sends new IM to B.
13. IM server checks that B has secure IM capability and can therefore understand secure IMs.
14. B receives IM from A.
15. B notes that IM is of type application/pkcs7-mime, and is signed.
16. B gets A's certificates from cache, if present, or from server.
17. B decrypts IM with B's private encryption key.
18. B verifies signature using A's public signing key.
19. B generates new plaintext IM from result of decryption.
20. B displays plaintext IM.

Steps 7 11 and 17 19 can also be performed automatically by the S/AIM client. When a user is sending a message to someone not on his buddy list, he will not have the other user's certificate hash, so the caching strategy has to be different. For example, one approach can be to get the certificates when sending the first message and then discard the cache when closing the window. In the rare event that the sending user changes certificates in the middle of a message, the message sent to the recipient will fail in the decryption stage; the recipient can then send a client-error back to the sender to indicate that the sender should re-fetch the certificates and send again.

Figure 5:
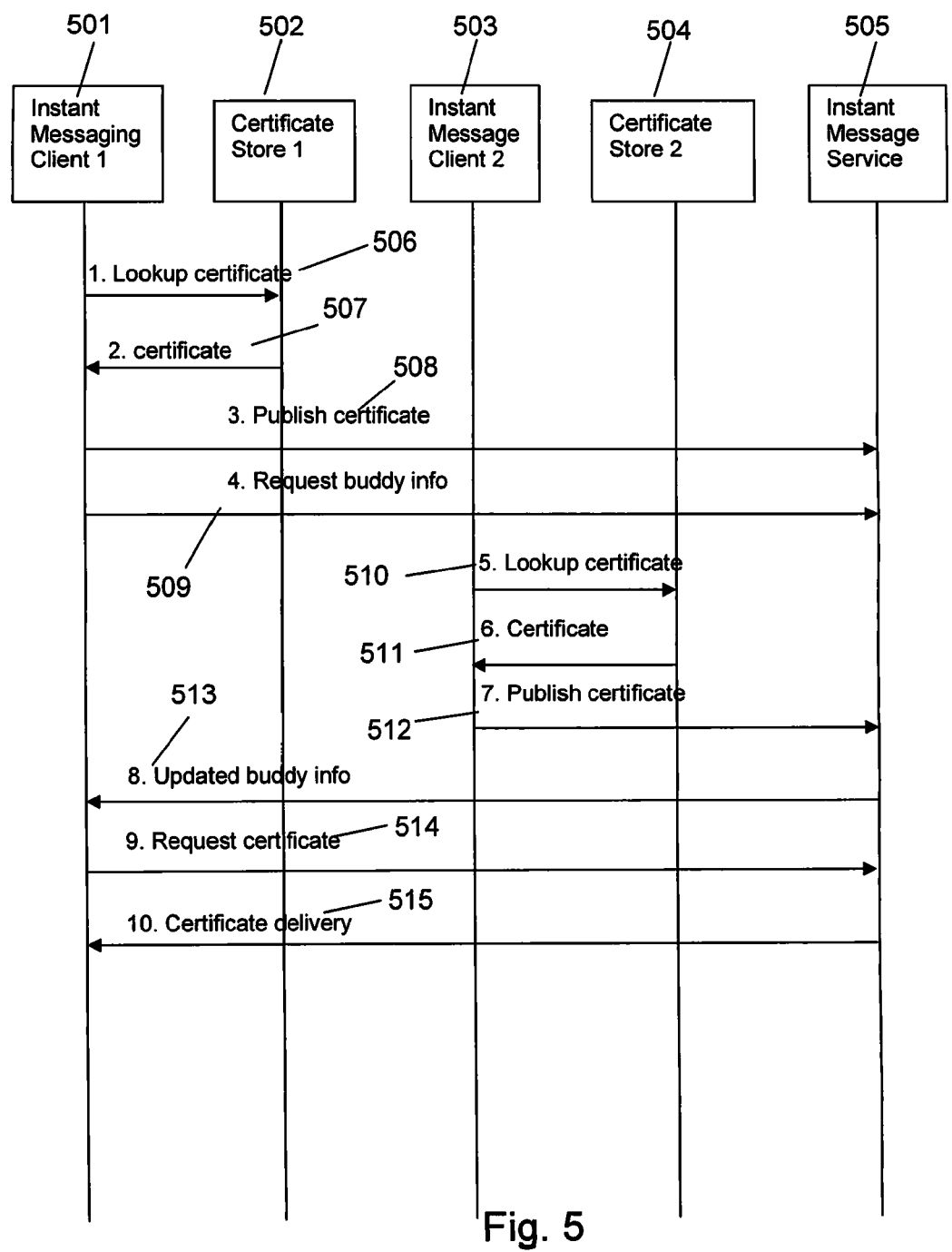
FIG. 5 is a block schematic diagram showing communications flow between secure AIM modules for publishing a user certificate according to the invention.

Referring to FIG. 5, a communication diagram showing interaction between modules of the invention during the publishing of a user's certificate sequence is shown. The steps that occur are: 1. IM client 1 501 attempts to locate a certificate 506 in certificate store 1 502. 2. Certificate store 1 502 returns the certificate 507 to IM client 1 501. 3. IM client 1 501 sends (publishes) the certificate 508 to the IM service 505, which the IM service 505 stores. 4. IM client 1 501 sends a request 509 to the IM service 505 to receive updated information on another user (buddy) in the IM service 505. The IM service 505 records the request. 5, 6, 7. IM client 2 503 locates a certificate 510, 511 for Secure IM and publishes it 512 in the IM Service 505. 8. The IM Service 505 sends updated buddy information 513 about IM client 2 503 to IM client 1 501. This information includes online status and an abbreviated value (hash/digest) computed from the published certificate. 9. IM client 1 501 compares the abbreviated value of the certificate with the certificate it has for the buddy, if any. If the values do not match, IM client 1 501 sends a request to the IM Service 505 to deliver the new data 514. 10. IM Service 505 sends the current certificate for the buddy 515 to IM client 1 501.

The certificate data that is published can include other information such: as separate certificates for operations such as signing or encryption; additional certificates for creating "chains"; or updated revocation status information.

AIM Screen Names

Screen names on the AIM service are a sequence of alphanumeric characters. Upper and lower case are equivalent for screen names. The service allows the user to "format" the name by choosing upper and lower case, or by inserting spaces into the name.

When screen names are stored in the S/AIM subscriber database or included in a certificate, the name will be canonicalized by converting all characters to lower case, and removing all spaces. For example, the screen name "Aim User 1" will be converted to the standard "aimuser1" in the database and in certificates.

When comparisons are made between screen names (for equality), each input value must be converted to the standard form. For example, when the AIM client verifies that a certificate belongs to a particular screen name, it must convert the screen name received in the IM to the canonical form before comparing it to the name found in the certificate (which is already converted).

Friendly Names

Because of the number of screen names in use on the AIM service, names chosen by the EHS service during provisioning will usually be only loosely based on the identity of the user within the EHS service. For example, "user@coke.com" might be given a name like "UserC73960". The screen name assigned to an EHS customer might not be familiar to another person that is trying to communicate with them.

The enterprise version of the AIM client is able to use a directory to translate ordinary screen names into "friendly" names, which will be recognized more readily. For example, "UserC73960" might be displayed as "user@coke.com", or even "John Q. User, Coke Inc." The address book portion of the AIM client will perform this translation. This is additional processing beyond the normal work for S/AIM. The security components of S/AIM (certificates, encrypted messages) use the assigned AIM screen name.

Cell phones currently have a feature that is like this. Cell phones will display the phone number of an arriving call and allow the user to enter a phone number to make a call. However, the address book portion of the cell phone software can be used to display a friendly name when a call arrives or use a friendly name to locate a telephone number.

The AIM service supports screen names that look more like email addresses. Even if this is done, the enterprise client can use the "friendly name" lookup to display the first and last name of the other user instead of an email address.

Certificate Contents and Policies

The AIM client is configured with a private key and a certificate generated by a portion of the AIM service. The S/AIM client has the key of the S/AIM CA built in. This built-in certificate is used to determine the validity of a screen name certificate.

Certificates

The certificates generated by the S/AIM CAs are intended to bind an RSA public key to a particular screen name. RSA public keys are used because the RSA public key algorithms directly support both encryption (for setting up encryption keys) and signatures (for signing messages). Using a single key for both operations simplifies the management of keys and certificates, and reduces the data that needs to be published on the AIM service.

Multiple certificates may be issued and be valid simultaneously for a single screen name. A user may want to have access to S/AIM features from multiple locations, such as the office or at home. The user can enroll for a separate key and certificate at each location using the enrollment PIN that is created during account setup.

Certificates are generated using RSA signatures only.

Certificate Contents

The S/AIM certificate will contain the following fields: X.509 version number (v3) Issuer Name Serial Number Validity Time Subject Name RSA Public Key S/AIM Policy extension Certificate Subject Alternative Name If a certificate is issued to a user with a known AOL Screen Name, the screen name will appear in the "Other Name" field of a Subject Alternative Name extension. The "Other Name" field is a pair of values: a name type (Object ID) and a name value. AIM screen names will be identified with an OID taken from the Netscape OID space.

The data stored in this extension will be the canonical AIM screen name possibly encoded using the UTF-8 character set.

Certificate Validation

Prior to using a key contained in an S/AIM certificate to encrypt an IM, the client verifies that the certificate correctly ties the key to the screen name of the other end of the conversation (the peer). To be valid for use in S/AIM, the certificate should chain to a trusted root certificate.

In addition, the subject name in the certificate should have the correct form (as defined above) and the common name (CN) component of the name should match the screen name of the peer.

If these requirements are met, the key can be used to validate a signature on a message from the screen name or to encrypt a message to the screen name.

Certificate Revocation

Certificates need to be revoked for two distinct reasons: 1. The name contained in the certificate is no longer valid. This can occur when the user changes names, or an account is terminated. 2. The key that is certified has been compromised (or suspected to be compromised).

The AIM CA will not revoke certificates solely because of changes in the account status (termination). There are likely to be a large number of changes in account status, which would cause large numbers of certificates to be listed on a CRL. Instead, only keys (actually certificates corresponding to keys) that are compromised will be listed.

Since the AIM service prevents screen names from being reused for some period of time, we can prevent a situation where two certificates for the same screen name are valid for different users by requiring the certificate to expire within the reuse interval.

Compromise of a key corresponding to a screen name will require that the user stop using the screen name for secure messages until the certificate for that key expires. The user should create a new screen name, and transfer the subscription to that account. The old screen name should be deactivated.

Online Certificate Status Protocol (OCSP) Services

Secure AIM will use OCSP to request and distribute revocation status for certificates. CAs that issue certificates for S/AIM will provide an OCSP responder that is publicly available. The certificates that are issued for S/AIM include the location of the OCSP responder in the Authority Information Access extension.

To improve the scaling of the OCSP operations, OCSP requests will be performed by the AIM clients once per login, or every 24 hours on their own certificates. The results of this OCSP request (the signed status response) will be published in the AIM service as part of the certificate data record.

AIM clients download the certificate data record prior to verifying the signature on a message they receive, or sending an encrypted message to a buddy. The client will verify that a recent OCSP status response (once issued in the last 24 hours) is present in the data record.

Figure 6:
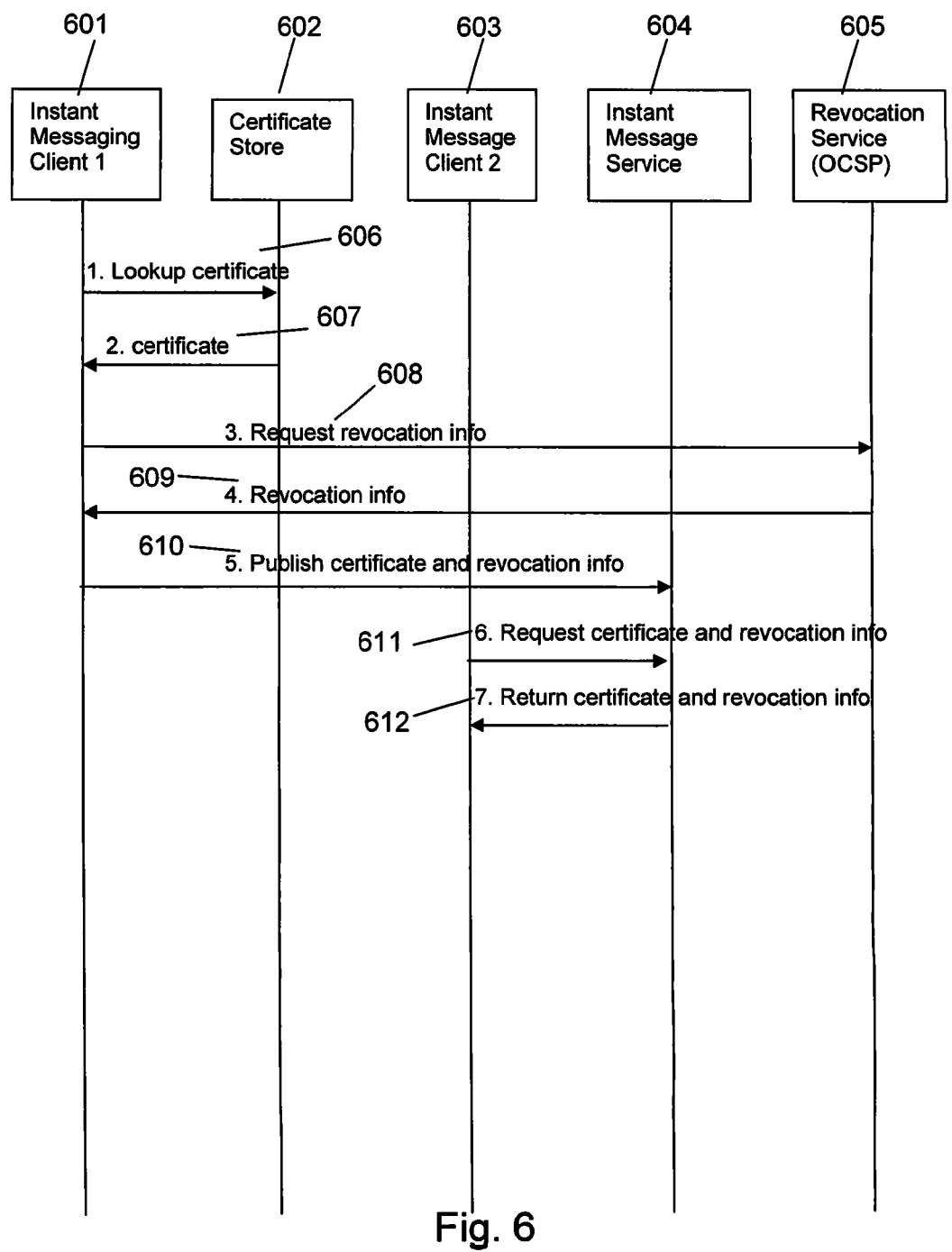
FIG. 6 is a block schematic diagram showing communications flow between secure AIM modules for publishing a user certificate and revocation information according to the invention.

With respect to FIG. 6, a communication diagram showing interaction between modules of the invention during the publication of a user's certificate and revocation information sequence is shown. The steps that occur are: 1. IM client 1 601 attempts to locate a certificate 606 in certificate store 602. 2. Certificate store 602 returns the certificate 607 to IM client 1 601. 3. IM client 1 601 creates and sends a request for revocation information about the certificate 608 to the revocation service 605. Online Certificate Status Protocol (OCSP) is one possible revocation service. 4. Revocation service 605 creates revocation information 609 for the certificate that is valid at the current time and will be valid for some specified time period. 5. IM client 1 601 publishes the certificate and revocation information 610 to the IM service 604. 6. IM client 2 603 sends a request 611 to the IM service 604 to retrieve the certificate and revocation information for a buddy. 7. IM service 604 returns the information 612 to IM client 2 603. IM client 2 603 check that the revocation information is sufficiently current and that it shows the validity of the certificate.

More than one certificate may be published to the IM service. The revocation information can contain data about all of the certificates or separate revocation information may be published for each certificate used. The IM client may store revocation information (possibly in the certificate store) and reuse it during a later session if the validity time period requirements are met.

Certificate Validity Period

As discussed in the section on certificate revocation, the validity period of AIM certificates needs to be tied to the policy that is in place for reuse of an abandoned screen name. The validity time for certificates will be set to the reuse time period less a safety factor.

Other Certificate Contents

In addition to the basic certificate data fields (Issuer Name, Serial Number, Subject Name, Validity and Key), S/AIM certificates contain the following extension: Certificate Policy—contains a new policy OID to identify S/AIM certificates.

Secure Session Establishment

This section discusses a way to improve the processing time for individual messages by precomputing a set of session keys that will be used for each message in a "conversation". This adds complexity to the application. Also, the format that it generates will probably be incompatible with the standard S/MIME PKCS #7 format, which might prevent forwarding the message to the recipient by email.

Normal use of the CMS protocols requires two public key operations for each message: one for wrapping the key (enveloping) and one for signing. On desktop systems these operations are reasonable. On slower devices like the Mobile Communicator (MC), the private key operation is very slow (8 sec).

The major factor in performing the decryption operation is the private key step required to recover the encryption key (using RSA). This step can be saved if the remote party reuses the previous encryption key value in subsequent messages. Note that reusing the key requires that a block cipher with varying IVs, or a stream cipher that has an additional key derivation step built in (using a salt value).

Similarly, the major factor in sending messages is the signature, which requires a private key operation. This step can also be saved on individual messages by creating an integrity key. This key is signed (with the RSA key) once, and then re-used in following messages in the "conversation".

Algorithm Negotiation

Another preferred embodiment of the invention provides a method to allow various devices to participate in the secure IM environment and to allow migration to future algorithms. The invention allows the algorithms used for encryption, integrity, key management and signing to be negotiable.

Since there is no direct communication between the parties of the conversation (user and buddy) during session establishment, information about each participant's preferences for algorithms must be available in a different way. This information is security sensitive, since a negotiation that results in a weaker set of algorithms that may have been chosen otherwise is undesirable (rollback attacks).

Default Algorithms

A set of default algorithms is defined that will be used in the initial deployment of the secure messaging application. However, the protocol allows other (more recent or locally preferred) algorithms to be used.

There are three points where cryptography is used in this secure messaging protocol: the (optional) message signature; bulk encryption of the (possibly signed) message; establishment of the bulk encryption key.

Notification of Certificate Change.

The invention provides a notification service for changes to the published certificate field. This service is used by AIM clients to update the certificate information for their buddies or for people they are conversing with. Without this service, a client would be forced to poll the service for updated information or rely on the information that was current when a conversation is started.

When the value of the certificate field changes (either due to a new value being stored by the user, or a sign-on/sign-off event), the service delivers the screen name of the buddy together with the new version value in the certificate field. The recipient of this message can decide whether the new certificate value is different than the previous version, or locally cached version, and if needed, request the entire certificate.

AIM Client UI

The client UI for secure messaging clearly displays the status of the data that is received. In addition, it indicates the level of security that will be applied (or was applied) to outgoing messages. This information is indicated by using icons in the general portion of a conversation window, and on each message that is displayed.

Creation of Conversation Window

A conversation window is established in two cases: 1) the user initiates a message addressed to a particular buddy; and 2) an incoming message is received from a buddy. In both of these cases, a conversation window is established for communication between the user and the specific buddy.

For secure IM, a client will attempt to establish a secure session key during creation of the conversation window. If this operation succeeds, the window is created with UI elements that indicate that the window is secure. If no session can be established, then the UI indicates a normal conversation. Notice that the window will display the status of outgoing messages. It may still be possible to receive and display secure incoming messages. Also, the security status of a conversation window may change if the buddy changes devices or locations.

Display of Conversation Messages

The conversation window displays both incoming and outgoing messages. The display area for these messages has an area reserved for displaying the security status of each message individually. Outgoing messages have an indicator that shows whether the message was encrypted when it was sent. Incoming messages have icons for the encryption and the signature status of the incoming message.

Note that over time, the status of the conversation may change. For example, the buddy may send a message using a desktop client that does not have secure IM capabilities. This message would not have the security icons displayed with it. Later, the buddy may start using his Mobile Communicator. Messages sent from this device that are encrypted would display the indicators for an encrypted and/or signed message, as appropriate.

Session Key Management

The conversation window is also the center of the session key management. A conversation window is established for communicating with a particular buddy. The session key established for that conversation is kept in a context associated with the conversation window. If the window is closed or deleted, the key will be lost. If a new conversation is established, a new key will be generated, signed, and wrapped for transfer to the buddy.

Secure File Transfer

This section describes an exemplary high level design for adding security features to the aim file transfer feature.

Confidentiality

Data transferred using the file transfer protocol is encrypted while it is transmitted over the network. Encryption is only required during the transfer. The data will be stored at each end in the normal (plaintext) form.

Integrity

The data transferred using the file transfer protocol is protected against alteration while it is transmitted over the network. The protocol ensures that the correct data has been received for an entire file or document, even when only parts of the file are transmitted because portions of the file were already on the recipient's system (partial transfer mode).

Identity

The protocol provides a way to identify both the sender and the recipient of a data transfer. In particular, the identity of a user that is requesting a file must be securely established so that access control decisions can be made based on that identity. The identity of the user transmitting the file needs to be securely established so that the recipient can be sure it is receiving the information from the source it expected.

Receipts

The secure file transfer system provides a method to generate a receipt that indicates that a file or document was received and will be processed. Receipts contain a date, the name of the file and (possibly) a value computed from the contents of the file. Receipts are represented as PKCS #7 Signed Data values.

Receipts are different in meaning from "signatures". That is, even though the syntax (the format) of the receipt is the same as a signature, the semantics (meaning) is different. Receipts acknowledge that the data was received and will be processed while signatures are a way for the signer to assert the correctness of the data.

Signatures

The secure file transfer system provides a method to generate a cryptographic signature on a file or document that can be used to verify the data in the file and the identity of the signer. Signatures can be stored separately from the contents of the file, so that applications can use the transferred file without needing to process signature values.

The file transfer protocol could transmit signatures as an additional file associated with the primary file.

Compatibility

The secure file transfer protocol is compatible with clients that do not support the secure mode. Secure clients are able to perform file transfers without the security features, and display the status of the transfer to the user.

Design

Peer-to-Peer SSL Channel

Secure file transfer uses SSL to secure the peer-to-peer connection that is used to transfer messages in the file transfer protocol (including the file contents). SSL is used for this component instead of S/MIME for several reasons: SSL provides integrity for the protocol messages in addition to the file contents. This protects against changes to values in the messages such as the name of the file being transferred. SSL (together with certificates) identifies the user at each end of the connection. This information may be used by the user to decided whether to accept an incoming request to send or receive a file. SSL provides encryption while the file data is being transferred.

S/MIME technology is used to provide signatures on the data. In particular, the client provides digital signatures on files by using the "detached signature" data format from the Cryptographic Message Syntax (CMS).

Establishing the SSL Channel

If both clients in the file transfer are capable of secure mode, the peer-to-peer connection made between them is established using SSL. The ability to use the secure channel will be indicated in the proposal offered by the client initiating the request, and must also be indicated in the acceptance to the proposal.

The SSL channel is authenticated at both ends by using certificates issued for AIM screen names. The AIM client accepting the connection (listener) uses an "encryption" certificate to perform the role of an SSL server. The AIM client establishing the connection uses a "signature" certificate to perform the role of an SSL client.

The clients use the existing file transfer protocol (with some modifications) over the SSL channel. The SSL channel will provide security for protocol records (headers etc). This provides privacy for the file names being transferred, and prevents modifications to the requests and responses in the protocol. In addition, the identities established by SSL are used to make access control decisions.

Partial File Transfer Hash

When a portion of a file is already present on the recipient's system, the file transfer protocol tries to optimize the data bandwidth by sending only the remainder of the file. The protocol includes an (optional) value that is a SHA-1 hash of the portion of the file that is already available. The algorithm used to compute the hash will also be sent in the message to allow changes in the future. The sender checks this value to determine whether to send the entire file, or just the remainder.

The sender sends the entire file if the hash does not match or it does not recognize the algorithm used for the hash. The transfer never fails when the hash does not match—instead the entire file is resent.

Receipts

The file sender is able to request a receipt by setting a bit in one of the protocol header fields. When the transfer is complete, the recipient constructs the receipt and sends it in a protocol record before the normal completion record.

Signatures

Signatures are generated by a signature generation tool and can be stored in a separate file with a related file name. For example, a document called "expenses.xls" would be "signed" by the tool, creating a new file called "expenses.xis.sig".

Clients that support secure file transfer recognize the related signature file and transfer the two files together or offer to transfer the signature in addition to the data file itself.

Clients that support secure file transfer can create these signature files "on the fly" by creating the contents in a temporary location (or in memory) and transmitting them to the recipient by specifying the related file name. This operation might be invoked by checking a box in the file transfer UI.

Secure Chat

Providing security for chat sessions is more difficult than peer-to-peer conversations, since keys must be distributed among several parties. In addition, the requirements on the type of signature may change, since more than two parties are participating.

Encryption

Include each party as a recipient in each message. Generate a single chat room key, which is distributed in chat "invitations".

Including each party as a recipient is just like the current secure email deployments. Each message contains multiple "recipient information" sections, which transfer the message key to a single participant in the chat.

An alternative is to create a single key for encrypting the chat messages the chat room creator might do that), and distribute that key in the messages that are used to invite people to the chat room. This approach changes the form of the encrypted message (the message is addressed to all participants in the room as one party).

Location Independence

Instead of allowing the user to certify multiple keys for a screen name (to support several locations), a Location Independence service can be provided that downloads the keys to the AIM client when the user logs on.

Multiple Certificate Policies

Additional certificate policy values can be defined that indicate different levels of authentication of the subscriber. For example, a "Bronze" level certificate might indicate that the certificate was issued directly by the AIM service (OSCAR) itself during login, while "Gold" might indicate a carefully validated EHS account.

Audited Instant Messages and Escrowed Keys

Some companies have a requirement to log all communications between their employees and others. To provide this service, three additions to this design are necessary. 1. Escrowed encryption keys. This allows company officials to recover the contents of messages when required. 2. Encrypting instant messages to the escrowed key, in addition to the primary recipient. This feature should be optional since it puts additional computational requirements on the client. 3. An audit log proxy that records messages. The proxy might also enforce the audit/escrow policy by blocking messages that are not encrypted using an escrowed key. In addition, it might also strip off the additional encryption information to reduce the size of the message on the way to the primary recipient.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method to secure communication of data via a messaging system across a computer network, comprising:
   accessing a certificate at a first messaging client, the certificate sent by a second messaging client via a messaging server, wherein the certificate associates a screen name with a public key value, the screen name being associated with a second user of the second messaging client, wherein a first user of the first messaging client is associated to the screen name of the second user by being listed on at least one list of preferred users of the second user as determined by the messaging server;
   encrypting an electronic message using the public key value associated with the screen name of the second user; and
   sending the encrypted message to the messaging server to be sent to the second messaging client.

2. The method of claim 1 wherein the messaging server is an instant messaging server, and wherein the electronic message is an instant message.

3. The method of claim 1 wherein the certificate is issued by a certificate authority.

4. The method of claim 1 further comprising:
   requesting the messaging server for updated certificate information associated with the second user;
   receiving the updated certificate information from the messaging server;
   determining that the updated certificate information does not match the certificate;
   requesting the messaging server for an updated certificate associated with the second user; and
   receiving the updated certificate from the messaging server.

5. The method of claim 1 further comprising:
   receiving a hash value from the messaging server;
   comparing the hash value with a hash value for the certificate stored in a cache accessible by the first messaging client;
   in response to the hash value not matching the cached hash value or the cached hash value not existing:
      sending a request for an updated certificate to the messaging server;
      receiving the updated certificate from the messaging server; and
      caching the hash value in the cache accessible by the first messaging client.

6. The method of claim 1 wherein encrypting the message includes:
   generating a conversation encryption key value; and
   storing the conversation encryption key value in the encrypted message,
   wherein the conversation encryption key value is configured to be used by the second messaging client to decrypt the encrypted message during an instant messaging conversation.

7. The method of claim 1 further comprising:
   signing the encrypted message with a private signing key associated with the screen name of the first user, wherein the second messaging client is configured to verify the signed message using a certificate of the first user.

8. The method of claim 1 wherein the certificate is associated with a particular physical location of the second user.

9. A method to secure communication of data via a messaging system across a computer network, comprising:

sending a first certificate from a first messaging client to a messaging server, wherein the first certificate associates a first screen name with a first public key value, the first screen name being associated with a first user of the first messaging client, wherein the first certificate is sent by the messaging server to users who are associated to the first screen name of the first user by being listed on at least one list of preferred users of the first user;

receiving an electronic encrypted message from a second messaging client via the messaging server, the encrypted message encrypted using the first public key value, wherein the second messaging client is associated with a second user included on the at least one list of preferred users; and decrypting the encrypted message using a private key associated with the first user.

10. The method of claim 9 further comprising receiving a second certificate at the first messaging client, the second certification sent by the second messaging client via the messaging server, wherein the second certificate associates a second screen name with a second public key value, the second screen name being associated with the second user.

11. The method of claim 10 further comprising:

requesting the messaging server for updated certificate information associated with the second user;

receiving the updated certificate information from the messaging server;

determining that the updated certificate information does not match the second certificate;

requesting the messaging server for an updated certificate associated with the second user; and receiving the updated certificate from the messaging server.

12. The method of claim 9 wherein the first certificate is issued by a certificate authority.

13. The method of claim 9 wherein the messaging server is an instant messaging server, and wherein the electronic message is an instant message.

14. The method of claim 9 wherein the encrypted message is received with a wrapping algorithm and a wrapping key, and further comprising:

extracting the wrapping key from the encrypted message; and using the wrapping algorithm and the wrapping key to unwrap the encrypted message.

15. The method of claim 9 wherein decrypting the message includes:

obtaining a conversation encryption key value from decrypting the encrypted message; and reusing the conversation encryption key in subsequent messages during an instant message conversation with the second messaging client.

16. The method of claim 9 wherein the encrypted message is signed, and further comprising verifying the signed message using the first public key value.

17. A system to secure communication of data, the system comprising:

a cache storing a certificate at a first messaging client, the certificate sent by a second messaging client via a messaging server, wherein the certificate associates a screen name with a public key value, the screen name being associated with a second user of the second messaging client, wherein a first user of the first messaging client is associated to the screen name of the second user by being listed on at least one list of preferred users of the second user as determined by the messaging server;

at least one processor configured to access the cache and configured to:

encrypt an electronic message using the public key value associated with the screen name of the second user; and send the encrypted message to the messaging server to be sent to the second messaging client.

18. The system of claim 17 wherein the messaging server is an instant messaging server, and wherein the electronic message is an instant message.

19. The system of claim 17 wherein the at least one processor is further configured to:

request the messaging server for updated certificate information associated with the second user;

receive the updated certificate information from the messaging server;

determine that the updated certificate information does not match the accessed certificate;

request the messaging server for an updated certificate associated with the second user; and receive the updated certificate from the messaging server.

20. The system of claim 17 wherein the at least one processor is further configured to:

sign the encrypted message with a private signing key associated with the screen name of the first user, wherein the second messaging client is configured to verify the signed message using a certificate of the first user.

* * * * *